US005896975A

United States Patent [19]

Lee

[11] Patent Number: 5,896,975

[45] Date of Patent: Apr. 27, 1999

[54] CHANGE STORING APPARATUS AND METHOD FOR AUTOMATIC VENDING MACHINE

[75] Inventor: Hee-Soo Lee, Kwangju, Rep. of Korea

[73] Assignee: Kwangju Electronics, Co., Ltd., Rep. of Korea

[21] Appl. No.: 08/886,380

[22] Filed: Jul. 1, 1997

[30] Foreign Application Priority Data

Jul. 11, 1996 [KR] Rep. of Korea .................. 1996-27986

[51] Int. Cl.[6] ........................ G06F 7/02

[52] U.S. Cl. ........................ 194/218

[58] Field of Search ........................ 194/217, 218; 235/382, 382.5; 340/825.33, 825.34, 825.35

[56] References Cited

U.S. PATENT DOCUMENTS

| | | | |
|---|---|---|---|
| 4,512,453 | 4/1985 | Schuller et al. | 194/217 |
| 4,669,596 | 6/1987 | Capers et al. | 194/217 |
| 5,544,086 | 8/1996 | Davis et al. | 380/24 |

FOREIGN PATENT DOCUMENTS

| | | | |
|---|---|---|---|
| 1104570 | 7/1984 | U.S.S.R. | 340/825.35 |

*Primary Examiner*—F. J. Bartuska
*Assistant Examiner*—Bryan J. Jaketic
*Attorney, Agent, or Firm*—Perman & Green, LLP

[57] ABSTRACT

An automatic vending machine, and more particularly to a change storing apparatus and method for an automatic vending machine which enables a user to store the amount of change as credit so that user can conveniently purchase goods by using the change stored in the vending machine thereafter. A change storing apparatus for the automatic vending machine has a key input part employing a storing key for storing remainder coins and a key pad for inputting a user code and a password to generate a predetermined key signal corresponding to a predetermined key. A control part stores the amount of change corresponding to the user code and the password according to the key pad of the key input part, and compares the registered user code and the password stored therein with an input user code and a password from the key pad of the key input part when the user code and password are input, and generates a control signal to display the amount of the change when those of the user code and password are identified, to discharge a selected goods when a predetermined goods is selected by the user. A display part displays the stored change according to the control signal output from the control part. A goods extracting part discharges the selected goods according to control signal output from the control part.

6 Claims, 3 Drawing Sheets

CHANGE STORING APPARATUS AND METHOD FOR AUTOMATIC VENDING MACHINE

BACKGROUND OF THE INVENTION

1. Field of the Invention

This invention relates, in general, to an automatic vending machine, and more particularly to a change storing apparatus and method for an automatic vending machine which enables a user to store an amount of change as credit so that the user can conveniently purchase goods by using the change stored in the vending machine thereafter as credit against future purchases.

2. Description of the Prior Art

Generally, automatic vending machines have been widely used around the world. The automatic vending machines contain various goods therein such as coffee, cigarette, cake, and candy in a goods safekeeping chamber and determine what kind of goods can be vended by the amount or sum of coins inserted by a user.

In these automatic vending machines, when coins are inserted into the automatic vending machine and a selecting button to a predetermined goods is pushed, the goods is extracted from a goods extract part of the automatic vending machine.

As shown in FIG. 1, a goods selecting apparatus of a conventional automatic vending machine includes a coin detecting mechanism 1 for providing a detected signal according to the value of inserted coins and the amount of the coins to be inserted in the automatic vending machine, a goods selecting part 2 for selecting a predetermined article among goods stored or provided therein, a control part 3 for generating a control signal to display a selling possibility state of goods befitting the inserted coins and the amount of the coins according to the detected signal from the coin detecting mechanism 1 and to extract the goods selected from the goods selecting part 2, a display part 4 for displaying the total inserted amount of money and a selling possibility state of the automatic vending machine according to a display control signal from the control part 3, and a goods extracting part 5 for extracting a selected goods according to a extracting control signal output from the control part 3.

Now, goods selecting and operating process of the conventional automatic vending machine will be explained hereinafter.

When coins are inserted through a coin inserting slot (not shown), condition of the coins or the bill and the amount of coins or bill are detected by a plurality of sensors(not shown) of the coin detecting mechanism 1 and a signal detected therefrom is provided to the control part 3. The control part 3 generates a control signal for displaying the total inserted amount of the coins according to the detected signal from the coin detecting mechanism 1. The display part 4 displays a selling possibility state according to the control signal from the control part 3 in case the total inserted amount of coins exceeds the price of the goods stored in the automatic vending machine.

After the selling possibility state of the goods shown in the display part 4 has confirmed, a selecting button is pushed by the user to cause the selected goods to be extracted from the automatic vending machine.

A button signal corresponding to the goods selected from goods selecting part 2 is provided to the control part 3. At this time, the control signal for extracting the selected goods is generated from the control part 3.

Accordingly, the user can obtain a predetermined article among the goods stored in the automatic vending machine any time, according to the control signal output from the control part 3.

In the control part 3, the coins inserted into the coin detecting mechanism 1 and selling price of goods are compared as to whether they are matched and if change is available, a control signal is generated to return the change. That is, the change is delivered to a coin deliver part(not shown) by a return signal generated from the control part 3. Thus, the user receives the change from the vending machine.

When the user intends to purchase goods by using the change thereafter, the user inserts the coins in the vending machine and selects the goods thereby being capable of obtaining the desired article.

However, there is a problem in the above automatic vending machine in that, when the user frequently uses the vending machine, change must be inserted in the vending machine every time by the user, thereby causing the user inconvenience of inserting the coins again.

SUMMARY OF THE INVENTION

It is, therefore, an object of the invention to provide an automatic vending machine, and more particularly to a change storing apparatus and method for an automatic vending machine which enables storage of the amount of change as credit so that user can conveniently purchase goods by using the credit change stored in the vending machine thereafter.

In order to accomplish the above object, there is provided a change storing apparatus for an automatic vending machine, the apparatus comprising:

- a key input part employing a storing key for storing remainder coins and a key pad for inputting an user code and a password to generate a predetermined key signal corresponding to a predetermined key;
- a control part for storing the amount of change corresponding to the user code and the password according to the key pad of the key input part, and for comparing the registered user code and the password stored therein with an input user code and a password from the key pad of key input part when the user code and password are input, and for generating a control signal to display the amount of the change when those of the user code and password are identified, to discharge a selected goods when a predetermined goods is selected by the user;
- a display part for displaying the stored change according to the control signal output from the control part; and
- a goods extracting part for discharging the selected goods according to the control signal output from the control part.

In order to accomplish the above, there is provided a change storing method for an automatic vending machine, the method comprising the steps of:

- checking an input user code from the key pad of the key input part after the automatic vending machine has started to be initialized with predetermined input parameters according to a control signal of the control part when an AC voltage is provided from outside to a power part, and performing a typical goods selling process when the user code is not input in the key pad of key input part;
- storing the amount of the change corresponding to the user code and the password from the key pad of the key input part when a storing key signal from the key input part is input to the control part within a predetermined time while the change is still available, and returning the change to a coin detecting mechanism after having checked the presence of the change, when the storing key signal from the key input part is not input and the predetermined time lapses; and comparing a registered user code and a password stored therein with an input user code and a password from the key pad of key input part when the user code and the password from the key pad of the key input part are input, and performing a typical goods selling process after having displayed a stored change corresponding to the user code through the display part, when those of the user code and the password are identified.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE PREFERRED EMBODIMENT

The invention will now be described in detail example with reference to the accompanying drawings.

Figure 1:
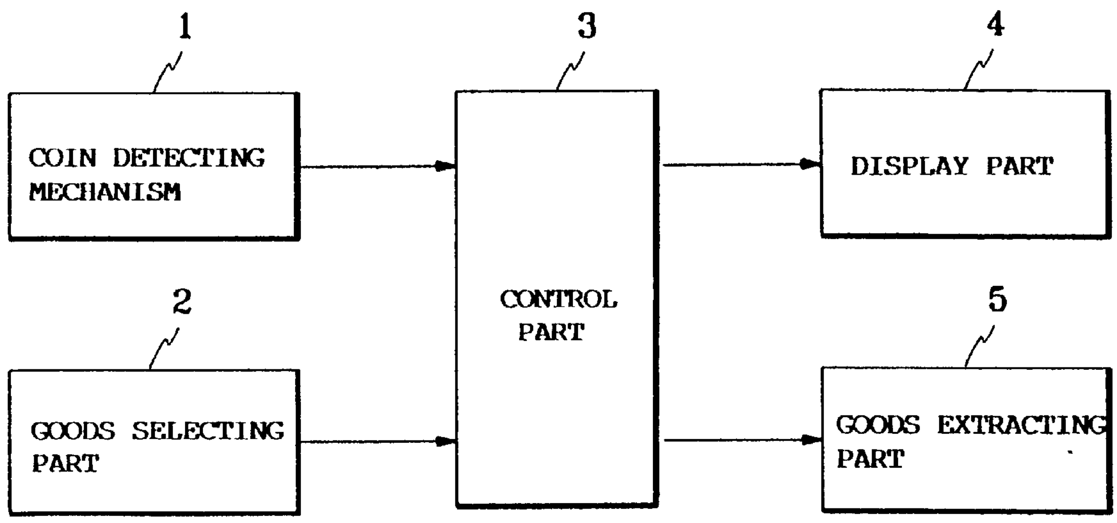
Fig.1 (PRIOR ART)
FIG. 1 is a schematic block diagram of a conventional automatic vending machine.
Figure 2:
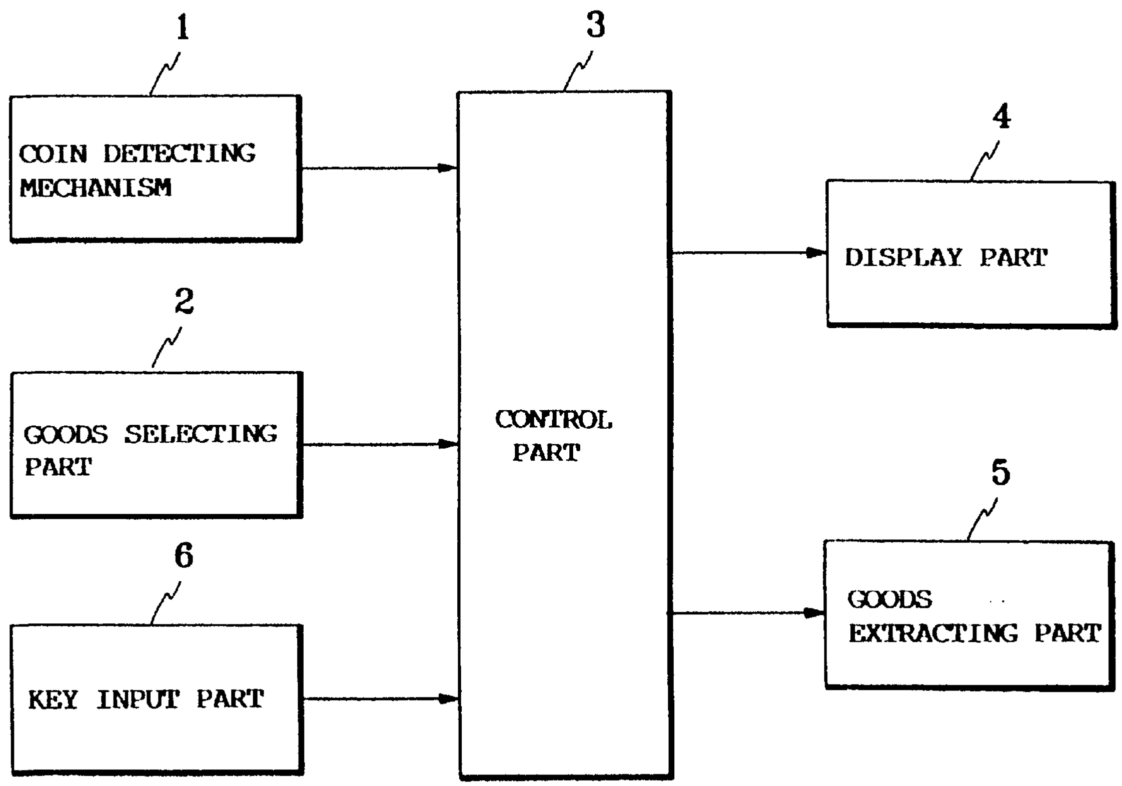
FIG. 2 is a schematic block diagram of a change storing apparatus for an automatic vending machine according to a preferred embodiment of the present invention.

Referring to FIG. 2, there is shown a change storing apparatus for an automatic vending machine according to the present invention, the apparatus comprising a coin detecting mechanism 1, a goods selecting part 2, a control part 3, a display part 4, a goods extracting part 5 and a key input part 6.

Also, the basic elements(for example, the coin detecting mechanism 1, the goods selecting part 2, the display part 4 and goods extracting part 5) of the invention are similarly constructed as those of the conventional automatic vending machine and description of the similar basic elements will be not described hereinafter.

In FIG. 2, reference numeral 6 is a key input part of the automatic vending machine.

The key input part 6 has a key pad, and a storing key for selectively storing the amount of change. When a predetermined key of the key input part 6 is input by a user, the predetermined key signal thereof is provided to the control part 3.

After the key signal from the key input part 6 has input to the control part 3, the control part 3 stores the amount of the change corresponding to the user code and the password, and compares a registered code and password stored therein with the input code and password from the key pad of key input part 6. When those code and password are identified respectively, the control part 3 generates a control signal to display the amount of the stored change.

Now, the change storing method for automatic vending machine of the present invention will be described with reference to FIGS. 2 and 3.

Figure 3A:
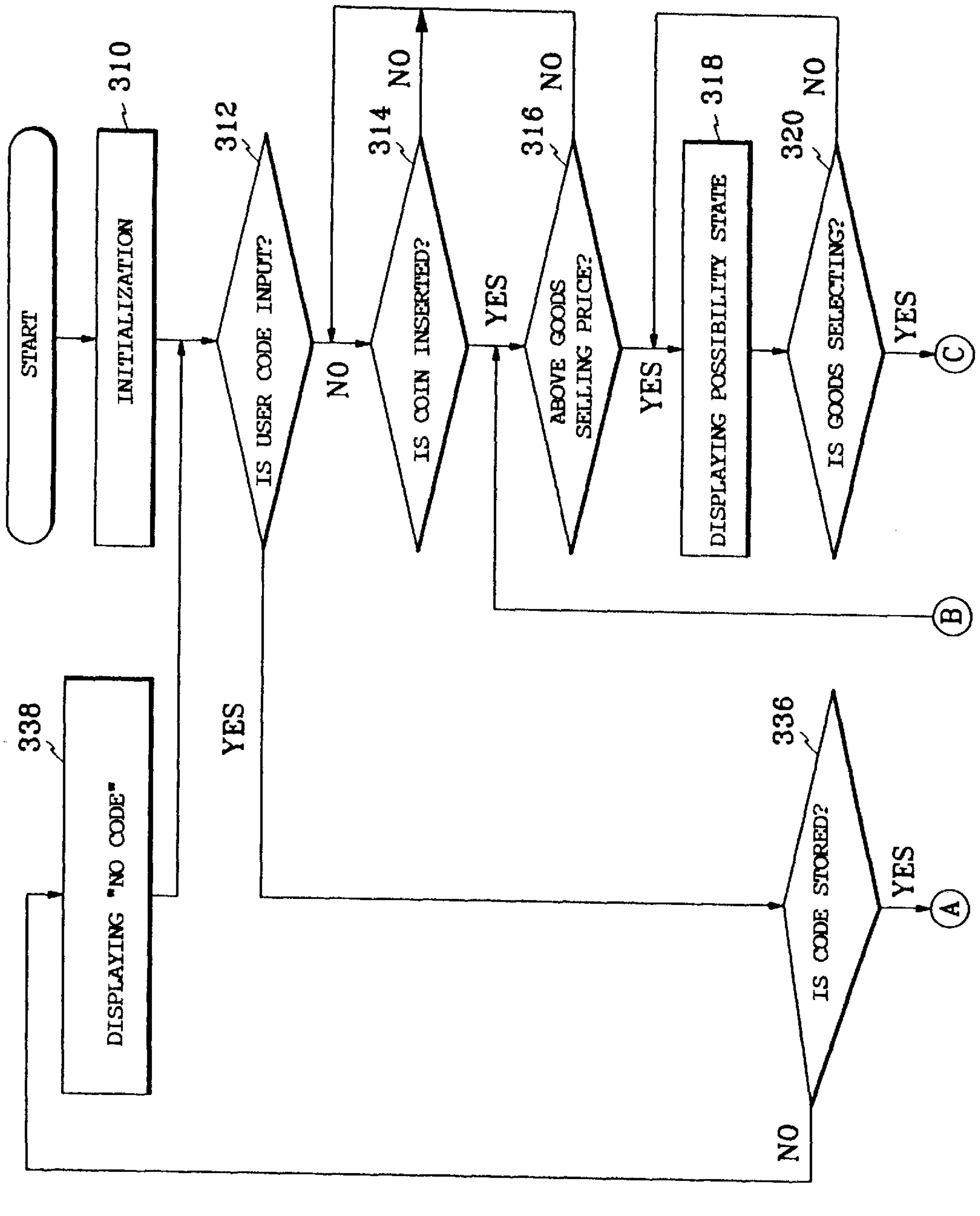
FIGS. 3A and 3B are a flowchart for explaining a goods selling process of the automatic vending machine according to the embodiment of the present invention.
Figure 3B:
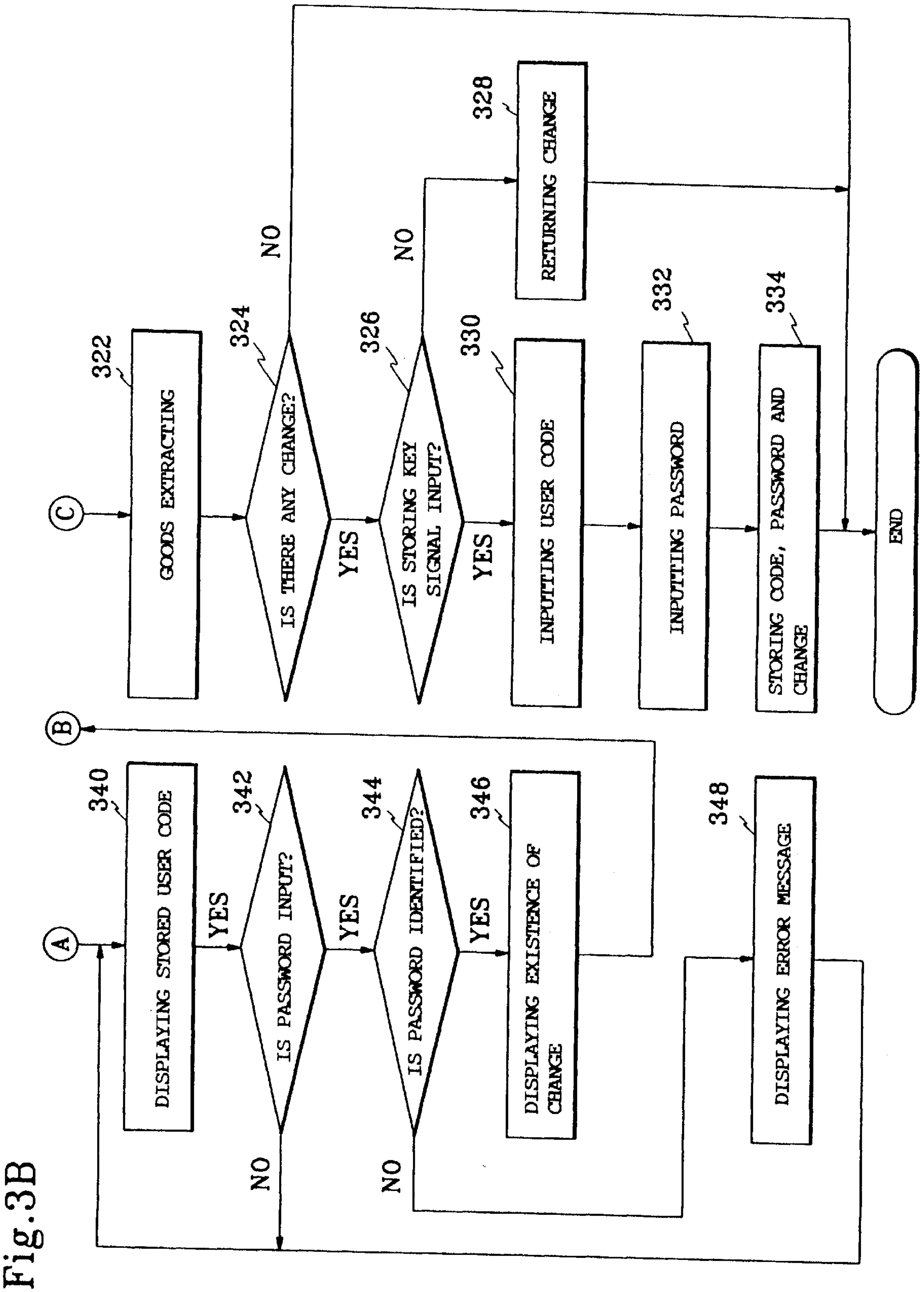

As shown in FIG. 3, when an AC voltage is provided from outside to a power part(not shown), the automatic vending machine starts to be initialized with predetermined input parameters according to a control signal of the control part 3 at step 310.

After the initialization at step 310, the control part 3 checks at step 312 whether the user code has been input from the key pad of key input part 6 and also checks a coin inserted state in the coin detecting mechanism 1 when the user code is not input in the key pad of key input part 6 at step 314.

After having checked the coin inserted state at step 314, when the coins are inserted in the coin detecting mechanism 1, the control part 3 determines whether the inserted coins are above the goods selling price at step 316 and if the inserted coins are less than the goods selling price, flow returns to step 314 and determines whether coins have been inserted into the coin detecting mechanism 1.

As a result of the determination at step 316, if the inserted coins are larger than the price of goods, the control part 3 generates a control signal to display the sales possibility state of goods and the sales possibility state(for example, a desirous light is maintained with "on" state) of goods is also displayed at the display part 4 at step 318.

When the user selects a desirous goods among the goods stored in the vending machine by touching and pushing the button of the goods selecting part 2 at step 320, a goods selecting signal corresponding thereto is provided from the goods selecting part 2 to the control part 3. The control part 3 generates a control signal to take out the goods according to the goods selecting signal output from the goods selecting part 2. The selected goods among the goods stored in the vending machine is discharged from the goods extracting part 5 according to the control signal from the control part 3 at step 322.

At this time, the control part 3 compares a selling price and a selected goods in view of the inserted coins, and checks if there is any change at step 324. If there is a change, the control part 3 checks if a storing key signal has been input from the key input part 6 at step 326.

As a result of the determination at step 326, if the storing key signal is not input from the key input part 6 to the control part 3 within a predetermined time, for example, 5 seconds, the control part 3 generates a control signal to return the change to coin detecting mechanism in case there remains a change after having checked the presence of the change at step 328.

As a result of the determination at step 326, if the storing key signal is input from the key input part 6 to the control part 3 within the predetermined time, for example, 5 seconds, the control part 3 determinates that it is time to store the change and stores the change corresponding to the user code and the password input from the key pad of the key input part 6 at steps 330, 332 and 334.

Meanwhile, as a result of the determination at step 312, when the user code is input from the key pad of key input part 6 to the control part 3, the control part 3 determinates if the input user code is to a registered code state stored inside at step 336.

If the user code is not stored in the control part 3, the control part 3 generates a control signal to display an error. The display part 4 then displays an error message, for example, "no code" according to a display control signal of the control part 3 at step 338.

As a result of the determination at step 336, if the user code is stored in the control part 3, the control part 3 generates a control signal to display the user code. The display part 4 displays the user code according to the control signal of the control part 3 at step 340.

A determination is made as to whether the password is input from the key pad of the key input part 6 at step 342, and if the user password is input from the key pad of key input part 6 to the control part 3, the control part 3 compares the input password with a password corresponding to the user code stored therein at step 344.

If the two passwords are not identical, the control part 3 generates a control signal to display the error. The display part 4 displays an error message, for example, "password incorrect" according to the control signal of the control part 3 at step 348.

As a result of determination at step 344, if the two passwords are identical, the control part 3 generates a control signal to display a change according to the user code in case there remains the change after having checked the presence of the change. The display part 4 displays existence of the change according to the control signal of the control part 3 at step 346.

The control part 3 is returned to the step 316 and then performs the steps 318, 320, 322, 324, 326, 328, 330, 332 and 334. Those steps have been already described above so that no further explanation is deemed necessary.

As described above, when the user inputs a user code and a password according to the key input part 6 for storing the change after having purchased a predetermined goods. The control part 3 stores the change according to the user code and the password.

When the user inputs the user code and the password according to the key pad of the key input part 6, the control part 3 confirms the user code and password stored therein and generates a control signal to display the change through the display part 4. The display part 4 displays the existence of the change according to the control signal of the control part 3. Then, the automatic vending machine performs the typical goods selling process.

As described above, there is an advantage in the change storing apparatus and the method for the automatic vending machine according to the present invention, in that the goods are discharged according to the stored change. That is, although the user does not insert the coins in the vending machine, the user can purchase a predetermined goods utilizing the stored coins thereby providing the user conveniences.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A change storing apparatus for an automatic vending machine comprising:

a key input part employing a storing key for storing remainder or credit coins and a key pad for inputting a user code and a password to generate a predetermined key signal corresponding to a predetermined storing key;

a control part for storing the user code and password as a registered user code and password, and an amount of change corresponding to the registered user code and the password input to the key pad of the key input part, and for comparing the registered user code and the password stored therein with an input user code and a password from the key pad of the key input part when the user code and password are input, and for generating a control signal to display the amount of the change when the user code and password are identified as registered, to discharge a selected goods when a predetermined goods is selected by the user;

a display part for displaying the value of stored change according to the control signal output from the control part; and a goods extracting part for discharging the selected goods according to the control signal output from the control part.

2. An apparatus according to claim 1 which comprises timer means for blocking the generation of the control signal if the storing key signal is not input within a predetermined time period.

3. A change storing method for an automatic vending machine comprising the steps of:

(a) registering a user code and password within the vending machine, and retaining any overpayment coins within the vending machine as credit against future purchases by the registered user;

(b) operating the vending machine in conventional manner to pay for and obtain selected goods and return any excess change, when no user code or password are entered within a predetermined time period; or (c) entering a user code and password into the vending machine, and checking whether they correspond to a registered user code and password, to obtain credit for any overpayment coins relating to the registered user code and password, against the cost of the selected goods, and (d) retaining any remaining overpayment within the vending machine as credit against future purchases.

4. The method according to claim 3 which comprises initially registering the user code and password within the vending machine in step (a) by means of a key pad of a key input means, and subsequently entering the registering user code and password in step (c) by means of the key pad of the key input means to obtain credit for the overpayment coins.

5. The method according to claim 3 in which step (b) comprises inserting coins to pay for the selected goods, checking whether a registered user code and passport are entered within a predetermined time period, and then detecting the value of the inserted coins.

6. The method according to claim 3 in which step (c) comprises displaying an error message on the vending machine when a user code and password input in step (c) do not correspond to a user code and password registered in step (a).

* * * * *